Jan. 30, 1962 J. A. HUMBLE 3,018,664
ACCELEROMETERS
Filed Nov. 27, 1959 2 Sheets-Sheet 1

INVENTOR.
JOHN A. HUMBLE
BY
ATTORNEY

Jan. 30, 1962  J. A. HUMBLE  3,018,664
ACCELEROMETERS
Filed Nov. 27, 1959  2 Sheets-Sheet 2

INVENTOR.
JOHN A. HUMBLE
BY
*Grover G. Frater*
ATTORNEY

United States Patent Office 3,018,664
Patented Jan. 30, 1962

3,018,664
ACCELEROMETERS
John A. Humble, Davenport, Iowa, assignor to The Bendix Corporation, a corporation of Delaware.
Filed Nov. 27, 1959, Ser. No. 855,834
6 Claims. (Cl. 73—503)

This invention relates to improvements in accelerometers and in particular to integrating accelerometers. Such devices are sensitive to acceleration and time to provide an indication or perform some function related to velocity.

One object of the invention is to provide an integrating accelerometer whose structural organization can be adapted to accomplish a wide variety of velocity indications under various conditions of acceleration and can be produced readily to provide any of such indications.

Another object is to provide a versatile, improved integrating accelerometer whose acceleration responsive components operate by well known principles whereby design calculations to provide an embodiment of the invention suitable for a specific application can readily be accomplished by workers in the art employing ordinary procedures.

Another object of the invention is to provide a device that can be made reliable, light in weight, and of small size suitable for inclusion in missiles and space vehicles.

While the invention may be employed to provide continuous indications of velocity, it is especially advantageously used to detect attainment of a selected velocity, either a fixed velocity value or one which is selected in view of some variable condition. Accordingly, an embodiment of the invention arranged for detection of a predetermined velocity has been selected for illustration in the accompanying drawing and the device shown employs accelerometer systems in which displacement of a mass is opposed by elasticity and friction. It is to be understood, however, that various modifications of the embodiment shown, and other embodiments of the invention, including embodiments for continuous velocity detection, may be made without departing from the spirit of the invention or the scope of the appended claims.

Other objects and advantages of the invention will hereinafter appear.

The invention can be understood by examining the requirements for an integrating accelerometer in a missile. Let it be required to provide a signal which indicates attainment by the missile of a given velocity regardless of the acceleration history of the missile, where acceleration history means the average acceleration from the time of missile firing to the time when said given velocity is attained.

Figure 5:
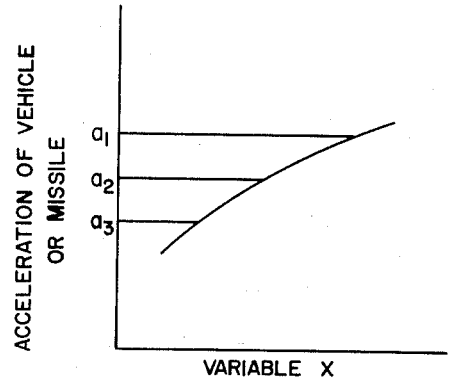
FIGS. 5 through 9 are graphs describing the operation of the invention.
Figure 6:
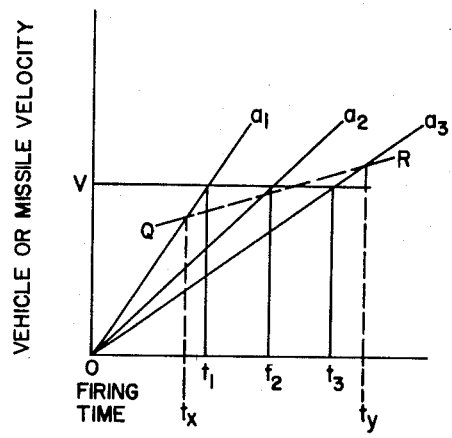

Suppose that this average acceleration, $a$, varies with some variable X as described in FIG. 5 and $a_1$, $a_2$, and $a_3$ are three values of average acceleration. The time at which the signal must be produced is defined in the law $v = at$ and is shown in FIG. 6 to be $t_1$, $t_2$, and $t_3$, respectively.

According to the invention, the signal can be produced at the required time by employing two accelerometer systems each including a mass whose movement is substantially a measure of average acceleration and in which the two masses are displaced in different degree in response to any acceleration. Means are included for detecting that degree of relative displacement of the two masses which represents the given velocity.

Figure 4:
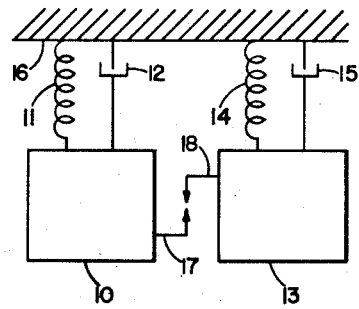
FIG. 4 is a schematic diagram of the integrating accelerometer shown in FIG. 1.

A number of physical arrangements are possible but one arrangement permits convenient manufacture and is shown diagrammatically in FIG. 4. This diagram shows two accelerometer systems. One comprises a mass 10, a spring 11, and a viscous friction device 12; the other includes a mass 13, spring 14 and viscous friction device 15. Both masses, 10 and 13, move upward in FIG. 4 relative to reference line 16 when the systems are accelerated downward. Both systems are overdamped whereby they respond to average acceleration and for any value of average acceleration, greater than zero, mass 10 is displaced a greater distance than is mass 13. Each mass carries a reference point, such as electrical contacts 17 and 18, the reference point 17 of mass 10 has an at-rest position displaced downwardly, in FIG. 4, from the at-rest position of reference point 18 of mass 13.

As the two systems are accelerated downward together, reference points 17 and 18 move upward. Point 17 moves upward more rapidly than point 18 and when point 17 has moved relative to point 18 through a distance equal to their original separation plus the distance moved by point 18, the two points will engage to complete an electrical circuit and thereby provide a signal.

Figure 7:
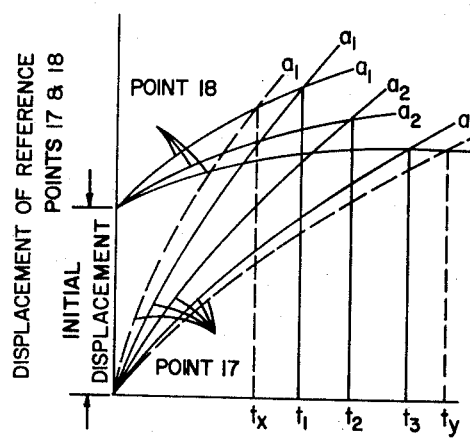

This movement of points 17 and 18 is described in FIG. 7 for the three values of acceleration $a_1$, $a_2$, and $a_3$. The displacement curves for points 17 and 18 must intersect at times $t_1$, $t_2$, and $t_3$ when average acceleration equals $a_1$, $a_2$, and $a_3$, respectively.

This condition is readily realized in a practical embodiment of the invention because the shape and separation of the displacement curves for each weight can be controlled by selection of values of mass, spring rate and friction by well known mathematical procedures.

In practice, masses and springs having fixed mass and spring rate are easily provided. Providing constant friction is more difficult but it is possible by using damping fluids to provide a friction force whose value varies only with viscosity change incident to temperature change. Movement of the mass is used to force flow of the damping fluid through a flow restriction. Constant friction may be accomplished by varying the effective area of the restriction with temperature.

Figure 8:
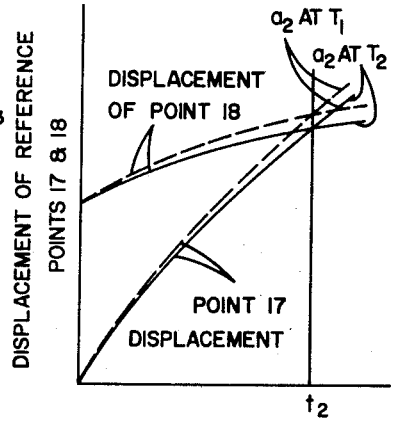

The invention is not limited, however, to systems in which friction is maintained constant. As illustrated by FIG. 8, the effect of friction change with temperature may be overcome by altering the damping fluid flow path with respect to but one of the accelerometer systems, and by temperature adjustment of the at-rest separation of points 17 and 18, as illustrated in FIG. 9.

It will be explained that the same body of damping fluid is employed, in the embodiment of FIG. 1, to frictionally oppose both masses but the fluid flow path is altered with respect only to mass 10. If, in FIG. 8, a temperature change from $T_1$ to $T_2$ results in the indicated change in the point 18 displacement curve then the displacement curve of point 17 must be made to change in the degree shown so that intersection at each of temperatures $T_1$ and $T_2$ occurs at time $t_2$. This can be accomplished by modification of the cross-sectional area of the damping fluid flow path to vary the damping effect applied to mass 10.

Figure 9:
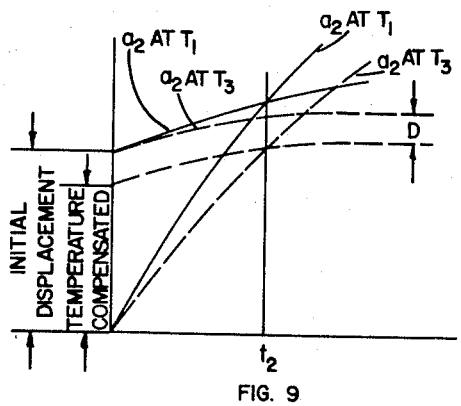

FIG. 9 illustrates that the effect of a change in the displacement curves of points 17 and 18 incident to a temperature change from $T_1$ to $T_3$ can be overcome, whereby the curves will intersect at time $t_2$, by change in the at-rest separation of points 17 and 18 in D degree. This can be accomplished by mounting one of the points, here point 18, on a bimetal element which moves point 18 a distance D toward point 17 when temperature changes from $T_1$ to $T_3$.

It should be noted that if the variable X is temperature and average vehicle acceleration increases with temperature, then in an accelerometer having fixed values of spring rate and mass, temperature compensation can be omitted if the damping fluid is selected to become less viscous with temperature increase at the rate at which vehicle acceleration increases with temperature. If a fluid having the required viscosity-temperature characteristic is not available then the damping fluid low path and reference point displacement may be altered to the extent that the fluid lacks the ideal characteristics.

It has been assumed in this discussion that it was desired to detect one given velocity V regardless of average acceleration of the vehicle or missile on which the integrating accelerometer is carried. The invention is not so limited. For example, it may be employed to indicate a different velocity for each value of average acceleration such, for example, as shown by dashed line $Q$—$R$ in FIG. 6. In this case a signal must be produced at time $t_x$ when $a$ is $a_1$ and time $t_y$ when $a$ is $a_3$. This necessitates a change in the $a_1$ and $a_3$ displacement curves for point 17 or point 18 (as shown by dashed lines in FIG. 7) or both. The displacement curves can be altered by appropriate selection of mass, spring rate and friction values in original design of the accelerometer systems or by subsequent variation of the friction as by controlled heating of the damping fluid.

Figure 1:
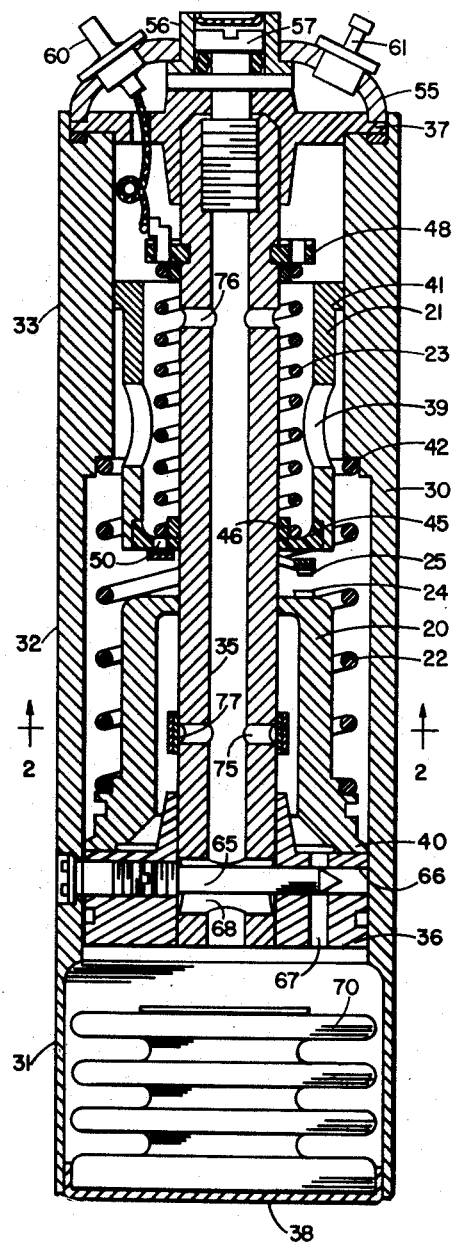
FIG. 1 is a view in central section of an integrating accelerometer embodying the invention.
Figure 2:
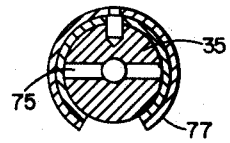
FIG. 2 is a sectional view taken on line 2—2 of FIG. 1.

Referring to FIG. 1, the specific embodiment of the invention illustrated comprises: masses 20 and 21 corresponding to masses 10 and 13 of FIG. 2; springs 22 and 23 corresponding to springs 11 and 14 of FIG. 2; and a body of damping fluid which is not shown in FIG. 1 but which fills the inner spaces of the device and performs the function of viscous friction devices 12 and 15 of FIG. 2. Reference points 17 and 18 of FIG. 2 appear as electrical contacts 24 and 25, respectively, in FIG. 1.

The device comprises a cylindrical casing 30 which can be considered to include three sections 31, 32, and 33 in series. Section 31, at one end, is a bellows compartment identified as having the largest inner diameter. The adjacent central section 32 is formed with a smooth bore of slightly smaller diameter and houses the mass 20. The other end section 33 has the smallest inner diameter and houses the mass 21.

A central guide tube 35 extends over the length of sections 32 and 33 and is held with its central bore coaxial with the central axis of the bores of sections 32 and 33. It is held at one end by insertion into a circular spacer 36 which fits tightly in the bore of section 32 at the end of said bore adjacent section 31. At its other or upper end, the guide tube 35 is inserted in an opening in the hub of a circular spacer 37 which fits tightly in and against the upper end of section 33.

The lower end of the casing 30 is sealed closed by an end closure 38 formed as a shallow cup which is soldered or otherwise suitably secured to casing 30 with the cup walls pressed into the bore of section 31. Thus the device has the form of an elongated cylinder having its ends closed by a closure member 38 at one end and a spacer 37 at the other end. A spacer 36 disposed within the casing divides its interior into two compartments, one a bellows compartment at section 31, and the other an accelerometer compartment comprising sections 32 and 33. The guide tube, held at its ends by spacers 36 and 37, extends axially through the accelerometer compartment.

The accelerometer weights or masses 20 and 21 are both cup-shaped and both have an annular flange extending outwardly at their respective rims. The holes 39 perforate the side walls of weight 21 and the bottom wall of both masses is perforated by a central opening whose diameter is only very slightly larger than the outer diameter of guide tube 35. The weights are assembled in the accelerometer compartment with their bottom walls facing one another and with the guide tube extending through their respective bottom wall perforations. The flange 40 of the heavier weight 20 has an outer diameter of size to provide a sliding fit between it and the smooth inner wall of section 32 over which it slides in operation. In like manner, flange 41 of weight 21 has a sliding fit in the smooth bore of section 33.

The change in the inner diameter of casing 35 at the transition from section 32 to section 33 forms a shoulder 42 against which rests one end of coiled spring 22. The other end of this spring engages flange 40 of weight 20. The spring 22 urges weight 20 to a position in which its rim just engages the spacer 36, as shown. In this condition the spring is in substantially relaxed condition.

The bottom wall 45 of weight 21 is formed of an electrically non-conductive material such as the Bakelite shown. A metallic spring retainer 46 fixed to the inner bottom of mass 21 retains one end of coiled spring 23. The other end of the spring is retained by a similar spring retainer which overlies an electrically non-conductive annular flange 48. This flange may be formed of Bakelite, as shown, and is molded in situ in an annular groove in guide tube 35.

Like spring 22, the spring 23 is shown in relaxed condition and it may be observed that the weights 20 and 21 are separated by some distance.

Spring 23 has electrical connection with a fastening element 50 which extends through the Bakelite end wall 45 of weight 21 and one point on a circular bimetallic element 51 which encircles and is spaced from the guide tube 35. The fastener 50 holds one side of the bimetallic element firmly against the mass end wall 45 to complete an electrical circuit from the spring 23 to the electrical contact 25 which is secured to the diammetric point on the element 51, see FIG. 3. The bimetallic element is bent away from the end wall 45 whereby the contact 25 may be moved toward and away from the cooperating contact 24 fixed to the electrically conductive weight 20 as the bimetal element 51 changes its shape as an incident to temperature change.

The spacer 36, having several openings, does not seal closed the upper end of the device. Instead complete closure is effected by a closure wall 55 whose margins may be soldered to the casing 30 as shown. The center of closure wall 55 is provided with a fitting 56 for the head of an adjusting screw 57 which extends through spacer 37 into the bore of guide tube 35 where its threads engage threads formed internally at the upper end of tube 35. Rotation of tube 35 is prevented by a needle valve 65, to be described later. A flange on screw 57, disposed between fitting 56 and spacer 37, prevents displacement of screw 57. Accordingly, tube 35 can be moved up and down to alter the initial spacing between contacts 24 and 25 by rotation of screw 57 and without compression or extension of either of springs 22 and 23. After the adjustment is made, a seal is soldered into fitting 56 to insure complete closure of the unit at this point.

Closure wall 55 also carries an electrical "feed-through" connector 60 which, as shown, is wired into electrical connection with the spring retainer. Wall 55 also carries a terminal element 61 which is electrically connected to the wall.

The needle valve 65 comprises a rod disposed in a hole 66 drilled along a diameter of the spacer 36. One end of this hole is enlarged and threaded to engage the threads on one, enlarged end of needle valve 65. A kerf here permits rotation of the valve 65 and consequent transverse displacement of the opposite, pointed end of the valve relative to a fluid flow path formed as a hole 67 which extends through spacer 36 in a direction parallel to the spacer axis and which intersects with hole 66.

The body or shank of the valve 65 extends through an elongated slot-like hole 68 formed laterally through the lower end of guide tube 35 so that up and down adjustment of the tube is permitted and so that rotation of the tube is precluded.

A sealed sylphon bellows 70 is disposed in the bellows chamber, section 31 of the casing, and may be secured to the end wall 38 as shown. It is the function of the bellows to expand and contract as the damping fluid changes in volume as an incident to temperature change. The damping fluid, which has been omitted from the drawing in the interests of clarity, is introduced into the unit via a fill port (not shown) which is then closed by a solder-secured sealing disc (not shown). Introduced under pressure whereby to apply an initial collapsing bias to the bellows 70, the damping fluid fills all of the voids within the casing 35.

Figure 3:
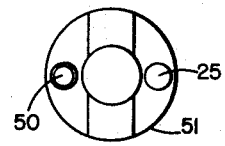
FIG. 3 is a plan view of a bimetal element employed in the instrument shown in FIG. 1.

Four holes are formed in the guide tube 35 to permit the passage of damping fluid between the bore of the tube and the space in the accelerometer compartment surrounding the tube. They are provided by drilling transversely through a diameter of the tube. Two of the holes 75 are formed at a point on the tube that is always within the hollow interior of weight 20 and the other two holes 76 are formed at a point of the tube that is advantageously always within the hollow interior of weight 21. An arcuately shaped bimetal element 77 partially encircles tube 35. It is secured at its midpoint, as best illustrated in FIG. 3 where it is shown to be silver soldered, to a point on the circumference of tube 35 midway between holes 75. Each end of the bimetal overlies one of the holes 75 and restricts the flow of damping fluid therethrough. The degree of restrictions varies with temperature as the diameter of bimetal 77 changes with temperature. The preferred damping fluid is a silicone oil. Such oils become less viscid as temperature increases. The bimetal 77 is arranged to increase the restriction of fluid flow from holes 75 at higher temperatures.

In operation, the device is mounted in a vehicle so that its bellows chamber is forward, in the direction of motion. Accordingly, the accelerometer of FIG. 1 moves downward in operation. The device is so shown in FIG. 1 to be consistent with FIGS. 5 through 9 in which the motion of the masses relative to the instrument casing during operation is considered to be displacement in the positive direction.

Prior to acceleration, the elements have the position shown. Bimetal elements 51 and 77 position contact 25 and restrict holes 75, respectively, in accordance with the temperature of the device. As positive acceleration begins, weights or masses 20 and 21 begin moving upwardly relative to casing 30. Weight 20 moves more rapidly than does weight 21 whereby contact 24 approaches toward engagement with contact 25. Motion of mass 20 is opposed by spring 22 and the damping fluid.

There can be motion only to the extent that fluid in the space above and surrounding weight 20 is moved to the space below and within weight 20. Very little fluid can flow in the spaces between the weight and tube 35 or casing 30. Instead the fluid is forced by upward motion of weight 20 through holes 39 of weight 21, into holes 76 of tube 35, down in the bore of the tube to the bellows chamber, thence up through hole 67 past needle valve 65 to the space within weight 20. Not all of the fluid must follow this path. An amount of fluid which varies with temperature by-passes the needle valve 65 by flowing from the bore of tube 35 through holes 75 past bimetal 77.

Motion of weight 21 is opposed by spring 23 and the damping fluid. The space between this weight and tube 35, and between its flange 41 and the inner wall of casing 30 is small. As the weight is moved up, fluid above and in the interior of the weight is moved through openings 39 to the space below.

Both of the systems, in the embodiment selected for illustration, are overdamped so that displacement of the weights depends upon average acceleration and whereby, for a given average acceleration, the contacts 24 and 25 may move as illustrated in FIG. 5 up to the point at which the displacement curves intersect. At this point contacts 24 and 25 engage and an electric circuit is completed from "feed-through" connector 60 and spring retainer 47 through spring 23 and thence through bimetal 51, contacts 25 and 24, mass 20, spring 22, and the casing 30 to terminal 61. Completion of this circuit signals that the device has attained the velocity required to be indicated.

In the description of FIG. 1, it was explained that both accelerometer systems are overdamped. It is obvious that the only requirement is that the contacts remain disengaged until the speed to be indicated has been reached. For certain conditions of acceleration, as where the slope of the acceleration curve increases continually until the required velocity is reached, both systems may be overdamped. In other instances, especially when the time to reach required speed is long in relation to the natural frequency of the mass and spring of that system in which the distance of mass movement is least, that system may be critically damped or even somewhat underdamped even though the slope of the jerk curve becomes negative. Advantageously, however, both systems are overdamped and for greater resolution in indication, the system whose mass moves the greater distance has the greater degree of damping.

The electrical contacts shown are but one example of a variety of electrical circuit devices in which relative movement of elements can be employed to signal relative positions of the weights. Resistive, magnetic, and capacitive devices such as potentiometers, rotatable transformers, and the like comprise relatively movable elements one of which can be made to move relative to the other in proportion to relative movement of the weights to indicate all relative positions whereby to provide, if desired, a continuous indication of velocity.

I claim:

1. An integrating accelerometer comprising two accelerometer systems including movable masses one of which experiences greater displacement in response to an acceleration than the other, means responsive to at least one degree of relative displacement of said masses for providing a signal indicative of attainment of a given corresponding velocity, and means responsive to a condition effective to alter the degree of damping in said accelerometer systems for adjusting the degree of damping in one of said systems substantially sufficient to compensate for the change in damping in both systems.

2. In an integrating accelerometer, a pair of masses elastically and frictionally restrained against motion and arranged for motion in differing degree in one direction in response to acceleration in said direction, the frictional restraint of at least one of said masses exceeding the restraint at which said one mass is critically damped, an electric circuit, and means for altering continuity of said electric circuit when said masses have a predetermined relative position.

3. An integrating accelerometer comprising two accelerometer systems including displaceable masses one of them experiencing displacement in greater degree than the other in response to an acceleration, said one mass being positioned ahead of the other mass in the direction of the acceleration, said other mass being frictionally damped in excess of critical damping, an electric circuit terminating in a pair of contacts which are movable in response to movement of said masses, respectively, and positioned for circuit completing engagement at a predetermined degree of relative movement of said masses.

4. An integrating accelerometer comprising two accelerometer systems, each including a displacable mass and one of which is displaced in greater degree than the other in response to an acceleration, each of said masses being frictionally damped in excess of critical damping, an electric circuit including a pair of relatively positionable circuit elements effective to provide a signal at at least one relative position, and means for moving said circuit elements relatively to one another in proportion to the relative movement of said masses.

5. The invention defined in claim 4, including means for adjusting the relative position of said circuit elements independently of the relative position of said masses.

6. The invention defined in claim 4, including means for varying the degree of damping in one of said accelerometer systems.

References Cited in the file of this patent

UNITED STATES PATENTS

| | | |
|---|---|---|
| 1,280,508 | McHenry | Oct. 1, 1918 |
| 2,033,127 | Dunlea | Mar. 10, 1936 |
| 2,272,984 | Ritzmann | Feb. 10, 1942 |
| 2,332,994 | Draper et al. | Oct. 26, 1943 |
| 2,603,726 | McLean | July 15, 1952 |
| 2,637,791 | Bleier | May 5, 1953 |
| 2,662,945 | Cockram | Dec. 18, 1953 |
| 2,793,261 | Towle et al. | May 21, 1957 |
| 2,883,176 | Bernstein | Apr. 21, 1959 |
| 2,904,651 | Williams | Sept. 15, 1959 |